June 18, 1963   F. G. BACK   3,094,581
ZOOM PROJECTION LENS
Filed Dec. 29, 1960   2 Sheets-Sheet 1
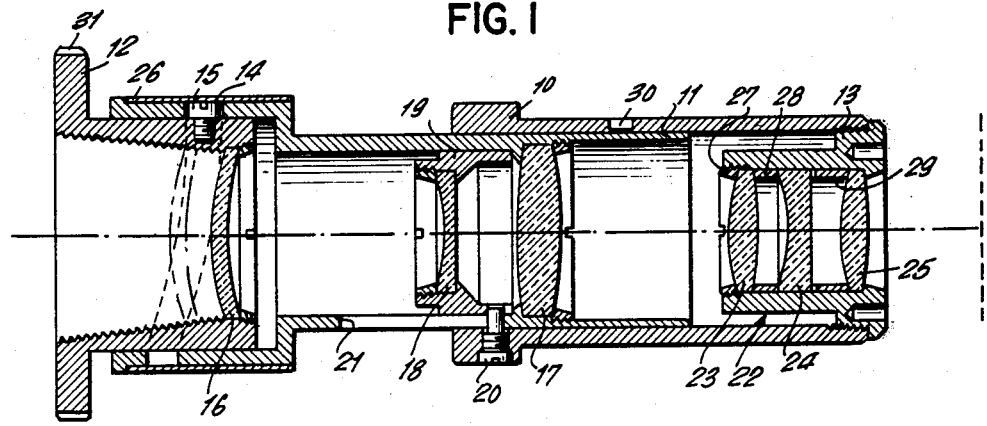
FIG. 1
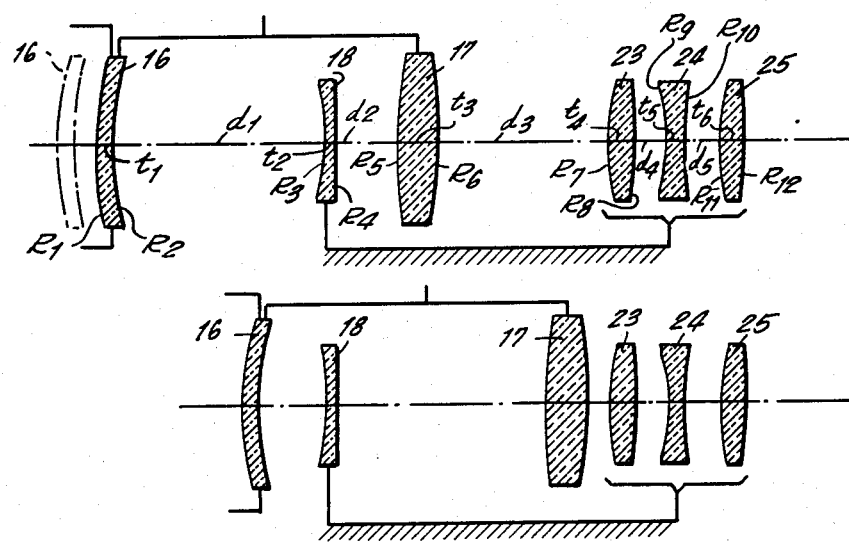
FIG. 2
FIG. 3
INVENTOR.
FRANK G. BACK
BY Albert T. Kronman
ATTORNEY June 18, 1963  F. G. BACK  3,094,581
ZOOM PROJECTION LENS Filed Dec. 29, 1960  2 Sheets-Sheet 2

INVENTOR.
FRANK G. BACK
BY Albert F. Kronman
ATTORNEY

United States Patent Office 3,094,581
Patented June 18, 1963

3,094,581
ZOOM PROJECTION LENS
Frank G. Back, 55 Sea Cliff Ave., Glen Cove, N.Y.
Filed Dec. 29, 1960, Ser. No. 79,349
2 Claims. (Cl. 88—57)

This invention relates to varifocal lens assemblies and specifically to a varifocal lens for use in conjunction with motion and still picture projectors and the like.

Where photographic projectors have been equipped with varifocal lenses, the varifocal feature has been employed for the purpose of adjusting the size of the projected picture to fill the screen. Thereafter, the whole lens assembly is moved with respect to the projector to bring the image into focus as is customary for projection lenses. In addition, the screen brightness at the wide angle position of the presently known varifocal lens systems is substantially lower than the brightness at the telephoto position. However, since during projection of the pictures the focal length of presently known varifocal lens assemblies is not changed, this defect does not become apparent to the observer.

Accordingly, it is an object of the present invention to provide a varifocal lens assembly for projectors which will avoid the short comings of presently known varifocal lenses.

An object of the present invention is to provide a varifocal lens which may be focused upon a screen at any distance and which will thereafter remain in focus although its focal length may be changed at will during the projection.

Another object of the present invention is to provide a varifocal lens for projectors which will keep the brightness of the picture substantially constant throughout the zoom.

A still further object of the present invention is to provide a new dimension of movement to photographic projections by adding zoom effect to pictures which have been taken without using varifocal lenses.

A feature of the present invention is the use of a first stationary lens of suitable size to change the relative aperture in a manner inversely proportional to the focal length whereby picture brightness is kept constant throughout the zoom.

Another feature of the present invention is the independent mounting of the first or variator lens within the slidable barrel of the varifocal lens assembly for independent focusing.

A further feature of the present invention is the compact structure of the lens assembly which lends itself to attachment to a projector.

The invention consists of the construction, combination and arrangement of parts, as herein illustrated, described and claimed.

In the accompanying drawings, forming a part hereof are illustrated two forms of embodiment of the invention, in which drawings similar reference characters designate corresponding parts, and in which:

FIGURE 1 is a view in longitudinal section of one form of a complete constant brightness projection zoom lens, made in accordance with the present invention, showing the movable elements in the forward or telephoto position.

FIGURE 2 is a somewhat diagrammatic view of the lens system shown in FIGURE 1.

FIGURE 3 is a somewhat diagrammatic view of the lens system shown in FIGURE 1 with the movable elements in the rear or wide angle position.

Figure 4:
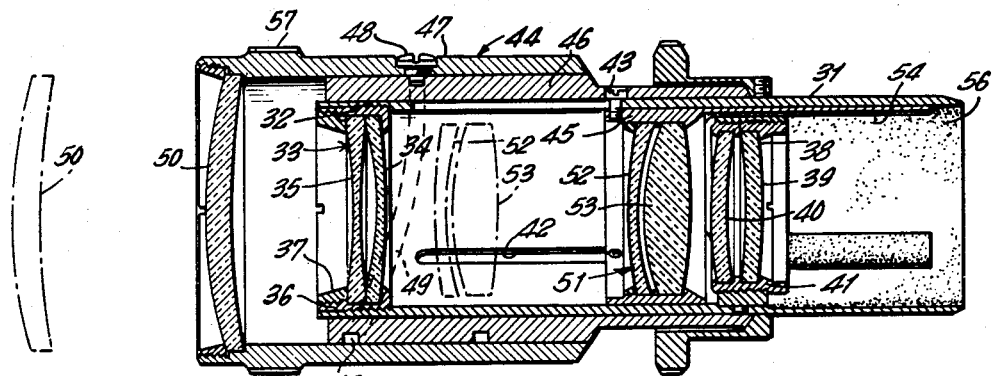
FIGURE 4 is a view in longitudinal section of a second embodiment of a varifocal lens assembly, made in accordance with the present invention.
Figures 5, 6:
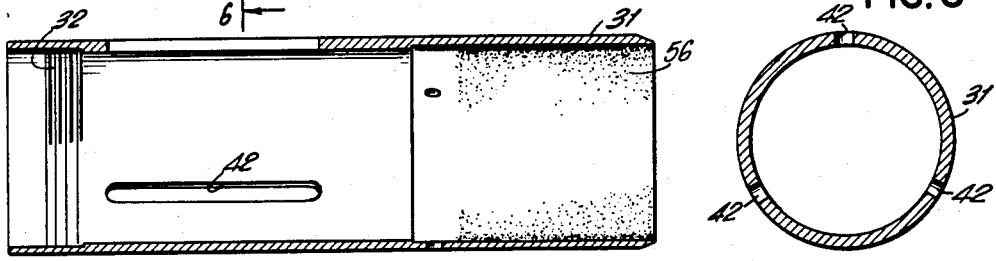
FIGURE 5 is a view in longitudinal section of the outer barrel shown in FIGURE 4.
FIGURE 6 is a cross-sectional view taken on line 6—6 in FIGURE 5.

In the following description the terminology for the various lenses which has been accepted in the varifocal lens art will be employed. The first movable lens will hereinafter be referred to as the variator. The second movable lens or lens group will be referred to as the compensator. The stationary lens or lens group between the variator and compensator will be called the erector and the rearmost lens assembly will be referred to as the relay. While the lens assemblies hereindescribed are of the optically compensated type it is to be understood that it is within the purview of the present invention to employ the lenses in a mechanically compensated lens structure.

Referring to the drawings and particularly to FIGURE 1, 10 indicates an outer barrel within which there is slidably carried a compensator mount 11. A variator mount 12 is disposed within the front end of the compensator mount 11 and the projector end of the outer barrel 10 is provided with a relay barrel 13 threadably secured therein.

The compensator mount 11 is provided with a helical slot 14, to receive a pin 15. The pin 15 extends from the variator mount 12 and permits the variator lens 16 to be moved independently of the remainder of the lens assembly by rotating the flange 31. The variator 16 may thus be moved from the position shown in full lines in FIGURE 1 to that shown in dashed lines. The purpose of shifting the variator 16 in this manner is to enable the varifocal lens assembly to be adjusted for the distance of the screen from the projector. Thus, in the position shown in dashed lines, the picture wil be in focus on a screen 6 feet from the projector. In the position of the variator indicated in full lines in FIGURE 1, the picture will be in focus upon a screen distance of 30 feet.

Once focused for the proper screen distance, the variator is shifted through the zoom together with the compensator 17 to which it is coupled by the compensator barrel 11, by sliding the compensator barrel axially within the outer barrel.

An erector lens 18 is carried within an erector mount 19 which in turn is secured to the outer barrel 10 by means of a small screw 20. The screw 20 traverses the compensator mount 11 by passing through an elongated slot 21 provided within the said compensator mount. In this manner, the compensator mount 11 can be slid along the optical axis of the varifocal lens without disturbing the rigid mounting of the erector 18.

The relay assembly generally indicated at 22 in FIGURE 1 is fixed and comprises a first relay lens 23, a second relay lens 24, and a third relay lens 25. The relay lens elements are held within the relay lens barrel 13 by means of a retainer 27 which is threadably received therein. The relay lenses are also held in spaced relationship by spacers 28 and 29.

A sleeve 26 overlies the front end of the compensator barrel 11, and covers the helical slot 14 therein to prevent foreign matter from entering the lens assembly at this point.

The varifocal lens assembly may be secured to a projector (not shown) by any suitable means such as the milled slot 30 shown in FIGURE 1.

Referring to the lens system shown in FIGURES 2 and 3, it will be seen that the variator 16 comprises a positive lens element, the erector 18 comprises a negative lens element and the compensator 17 is a second positive lens element. The relay consists of a positive negative positive lens element within the relay lens assembly. It will be observed that the erector 18 which is the first stationary element of the system is substantially smaller in diameter than the variator 16 and the compensator 17. By means of this construction it has been found possible to keep the brightness of the image projected upon the screen substantially constant.

The diameter of the axial bundle of rays passing through the erector 18 is smallest in the short focus position. The diameter of the axial bundle of rays increases proportionally to the equivalent focal length of the lens system during the zoom. Thus by making the clear diameter of the erector just large enough to accommodate the axial bundle in the short focus position, the bundle of rays is cut down during the zoom in proportion to the focal length.

The speed of the system is lowest in the long focus position of the varifocal lens system since the luminous energy is concentrated on a relatively small area on the screen. The speed increases inversely proportional to the focal length until it reaches its maximum at the short focus position where a large screen area has to be covered. The screen brightness is thus kept substantially constant throughout the zoom.

A specific example of a constant brightness varifocal projection lens system for use with standard 8 mm. motion picture film projectors is as follows:

[EFL=25.40 mm. to 15.10 mm.  BFL=10.90 mm.]

| Lens | Glass | Nd | V | Radii in mm. | Thickness (t) and Separation (d) in mm. |
| --- | --- | --- | --- | --- | --- |
| Variator 16 | CF-2 | 1.525 | 51.1 | $R_1 = +22.93$ | $t_1 = 1.915$ |
|  |  |  |  | $R_2 = +38.84$ | Variable $d_1 = 20.854$ to 6.354 |
| Erector 18 | DF-3 | 1.621 | 36.2 | $R_3 = -21.75$ | $t_2 = 1.37$ |
|  |  |  |  | $R_4 = -675.40$ | Variable $d_2 = 5.839$ to 20.339 |
| Compensator 17. | DBC-7 | 1.620 | 60.0 | $R_5 = +79.93$ | $t_3 = 4.32$ |
|  |  |  |  | $R_6 = -41.23$ | Variable $d_3 = 16.185$ to 1.685 |
| Relay 23 | DBC-7 | 1.620 | 60.0 | $R_7 = +17.32$ | $t_4 = 3.000$ |
|  |  |  |  | $R_8 = -48.25$ | $d_4 = 3.000$ |
| Relay 24 | EDF-3 | 1.720 | 29.2 | $R_9 = -16.75$ | $t_5 = 2.000$ |
|  |  |  |  | $R_{10} = +56.70$ | $d_5 = 3.000$ |
| Relay 25 | DBC-7 | 1.620 | 60.0 | $R_{11} = +18.17$ | $t_6 = 3.000$ |
|  |  |  |  | $R_{12} = -25.68$ |  |

CF=crown flint; DF=dense flint; DBC=dense barium crown; EDF=extra dense flint; EFL=equivalent focal length; BFL=back focal length.

Clear diameter of the erector is 9.2 for constant brightness.

In the embodiment shown in FIGURE 4, the outer barrel 31 is threaded at one end as indicated at 32 to receive the erector lens assembly 33. The erector lens assembly consists of two negative lens elements 34, 35, carried within a lens mount 36. A retaining ring 37 holds the erector lens elements in place. A relay lens assembly 38 is spaced from the opposite end of the outer barrel 31. The relay lens assembly consists of spaced lenses 39, 40, and a lens mount 41. The outer barrel 31 is fixed and secured to a projector in any well known manner (not shown). Elongated slots 42 are provided in the outer barrel 31 to receive pins 43. The pins 43 couple the variator mount 44 to the compensator mount 45. The variator mount 44 is slidably carried on the outer barrel and consist of an inner barrel 46 and an outer sleeve-like member 47. The outer sleeve 47 is rotatable with respect to the inner barrel 46 and is coupled thereto by a pin 48 which rides within a helical slot 49, in the inner barrel 46. In this manner the variator lens 50 which is carried in the front of the sleeve-like member 47 may be moved independently of the remainder of the varifocal lens assembly for focusing purposes.

Figure 8:
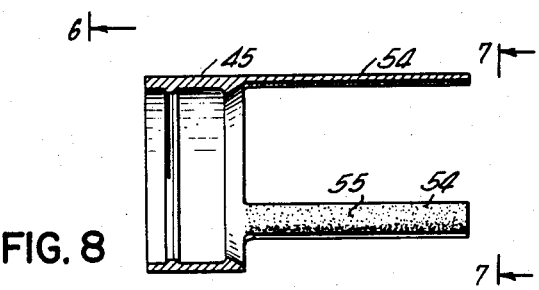
FIGURE 8 is a view in longitudinal section taken on line 8—8 in FIGURE 7.
Figure 7:
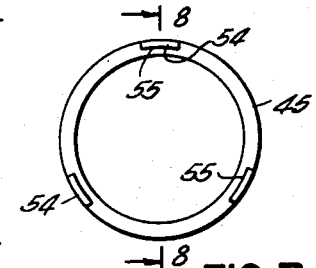
FIGURE 7 is an end view of the compensator barrel shown in FIGURE 4.
Figure 9:
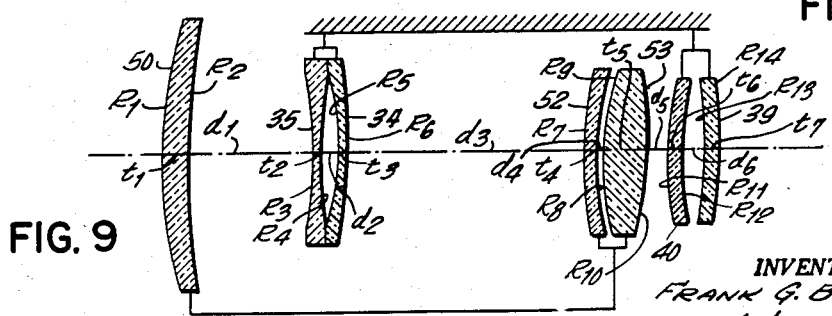
FIGURE 9 is a somewhat diagrammatic view of the lens system shown in FIGURE 4.

It will be observed from an examination of FIGURE 4 that the compensator assembly 51 consists of a negative lens 52 and a positive lens element 53 carried within the mount 45. The mount 45, as best shown in FIGURE 8 is provided with elongated segments 54, which extend beyond the relay lens assembly 38. When the variator mount 44 is slid from the position shown in FIGURE 4, to that indicated by the dashed lines, the segments 54 are brought forward to cover the elongated slots 42 and prevent foreign matter from entering the varifocal lens assembly. The inner surfaces of the segments 54 are provided with an anti-light reflecting coating 55, and a similar coating is given to the inside of the outer barrel as indicated at 56 in FIGURE 4.

In order to shift the varifocal lens assembly shown in FIGURE 4 from the short focus to the long focus position, it is merely necessary to grasp the knurled flange 57 which is provided in the variator mount 44 and move the said variator mount axially of the outer barrel 31.

In using the varifocal lens assembly shown in FIGURE 4, the variator 50 is first focused in the manner described in conjunction with the embodiment shown in FIGURE 1. Thereafter, as the projection proceeds the operator may zoom the projected picture in order to show close-ups or wide angle effects as desired. Throughout the zoom the picture will remain substantially in focus and the effect will be that of pictures having the appearance of those taken by cameras equipped with varifocal lenses. In this manner, a new dimension of motion can be given to projected pictures. New interest can be imparted to pictures which may have been viewed many times without the added feature of the varifocal projection lens. In the embodiment shown in FIGURE 4, the erector lens assembly 33, is again selected to be of a size which will be just large enough to accommodate the axial bundle of rays in the short focus position. Since the bundle of rays is cut down during the zoom in proportion to the focal length the projected image remains one of constant brightness throughout the zoom.

The embodiment shown in FIGURES 4 through 9 is particularly suited to 35 mm. still picture projection. A specific example of such a varifocal lens system is as follows:

[EFL=91.35 mm. to 155.60 mm.]

| Lens | Glass | Nd | V | Radii in mm. | Thickness (t) and Separation (d) in mm. |
| --- | --- | --- | --- | --- | --- |
| Variator 50 | LaF-2 | 1.744 | 44.9 | $R_1 = +91.36$ | $t_1 = 5.50$ |
|  |  |  |  | $R_2 = +174.52$ | $d_1 = 22.66$ to 60.16 |
| Erector 35 | KzF-2 | 1.5294 | 51.8 | $R_3 = -174.52$ | $t_2 = 2.00$ |
|  |  |  |  | $R_4 = +231.49$ | $d_2 = 2.50$ |
| Erector 34 | KzF-2 | 1.5294 | 51.8 | $R_5 = -84.13$ | $t_3 = 2.00$ |
|  |  |  |  | $R_6 = -1474.30$ | $d_3 = 47.44$ to 9.94 |
| Compensator 52. | SF-8 | 1.6889 | 31.15 | $R_7 = +86.52$ | $t_4 = 2.00$ |
|  |  |  |  | $R_8 = +41.23$ | $d_4 = 1.40$ |
| Compensator 53. | BK-7 | 1.5168 | 64.2 | $R_9 = +43.42$ | $t_5 = 8.88$ |
|  |  |  |  | $R_{10} = -84.95$ | $d_5 = 3.97$ to 41.47 |

[EFL=91.35 mm. to 155.60 mm.]—Continued

| Lens | Glass | Nd | V | Radii in mm. | Thickness (t) and Separation (d) in mm. |
|---|---|---|---|---|---|
| Relay 39 | SK-16 | 1.6204 | 60.29 | $R_{11}=+71.62$ | $t_6=4.00$ |
|  |  |  |  | $R_{12}=+167.83$ | $d_6=2.00$ |
| Relay 40 | F-2 | 1.620 | 36.34 | $R_{13}=-195.95$ | $t_7=4.00$ |
|  |  |  |  | $R_{14}=-220.00$ |  |

Laf=lanthanum flint; Kzf=short flint; SF=dense flint; BK=borosilicate crown; SK=dense crown (dense barium crown); F=flint.

Clear diameter of the erector 21.00 mm. for constant brightness.

From the foregoing it will be seen that there have been provided varifocal projection lens assemblies in which the operator can move the variator independently of the other lenses to focus the image upon a screen. Once focused the variator and compensator can be zoomed to any desired position within the range of the lens system to give zoom effects to the projected picture. The brightness of the projected picture upon the screen remains substantially constant throughout the zoom and the effect is to produce projected pictures having the appearance of pictures which were taken by a camera using varifocal camera lenses.

Having thus fully described the invention, what is claimed as new and desired to be secured by Letters Patent of the United States, is:

1. A varifocal projection lens system comprising a fixed outer barrel, a compensator mount slidably received within the fixed barrel, a variator mount carried at the front of the compensator mount, a variator lens in the variator mount, a compensator lens carried by the compensator mount spaced from the variator, an erector lens within the compensator mount between the variator and compensator rigidly secured through the compensator mount to the outer barrel, a relay on the projector end of the outer barrel, and means to move the variator axially with respect to the compensator to focus the lens system and thereafter slide the variator and compensator along the optical axis of the system to vary the focal length of the system in which the lenses have the following optical characteristics:

[EFL=25.40 mm to 15.10 mm. BFL=10.90 mm.]

| Lens | Glass | Nd | V | Radii in mm. | Thickness (t) and Separation (d) in mm. |
|---|---|---|---|---|---|
| Variator 16 | CF-2 | 1.525 | 51.1 | $R_1=+22.93$ | $t_1=1.915$ |
|  |  |  |  | $R_2=+38.84$ | Variable $d_1=20.854$ to 6.354 |
| Erector 18 | DF-3 | 1.621 | 36.2 | $R_3=-21.75$ | $t_2=1.37$ |
|  |  |  |  | $R_4=-675.40$ | Variable $d_2=5.839$ to 20.339 |
| Compensator 17 | DBC-7 | 1.620 | 60.0 | $R_5=+79.93$ | $t_3=4.32$ |
|  |  |  |  | $R_6=-41.23$ | Variable $d_3=16.185$ to 1.685 |
| Relay 23 | DBC-7 | 1.620 | 60.0 | $R_7=+17.32$ | $t_4=3.000$ |
|  |  |  |  | $R_8=-48.25$ | $d_4=3.000$ |
| Relay 24 | EDF-3 | 1.720 | 29.2 | $R_9=-16.75$ | $t_5=2.000$ |
|  |  |  |  | $R_{10}=+56.70$ | $d_5=3.000$ |
| Relay 25 | DBC-7 | 1.620 | 60.0 | $R_{11}=+18.17$ | $t_6=3.000$ |
|  |  |  |  | $R_{12}=-25.68$ |  | wherein Nd is the refractive index for D line, V is Abbe's dispersion number, CF is crown flint, DF is dense flint, DBC is dense barium crown, EDF is extra dense flint, EFL is equivalent focal length, BFL is back focal length, and the clear diameter of the erector is 9.2 mm. for constant brightness.

2. A varifocal projection lens system comprising a fixed outer barrel, a lens mount carried on the inside of the outer barrel and axially slidable with respect thereto, a variator lens secured at the front of the lens mount, a compensator lens carried within the lens mount and spaced from the variator lens, a fixed erector lens secured to the outer barrel and disposed between the variator lens and compensator lens, a relay assembly at the rear of the outer barrel, a variator lens support means comprising a sleeve-like member freely carried by the lens mount, a pin in said sleeve, a helical groove in the lens mount beneath the sleeve to receive the pin whereby the sleeve and variator lens are axially shiftable with reespect to the lens mount to focus the lens system, and means to slide the lens mount axially with respect to the outer barrel to vary the focal length of the lens system in which the lenses have the following optical characteristics:

[EFL=91.35 mm. to 155.60 mm.]

| Lens | Glass | Nd | V | Radii in mm. | Thickness (t) and Separation (d) in mm. |
|---|---|---|---|---|---|
| Variator 50 | Laf-2 | 1.744 | 44.9 | $R_1=+91.36$ | $t_1=5.50$ |
|  |  |  |  | $R_2=+174.52$ | $d_1=22.66$ to 60.16 |
| Erector 35 | KzF-2 | 1.5294 | 51.8 | $R_3=-174.52$ | $t_2=2.00$ |
|  |  |  |  | $R_4=+231.49$ | $d_2=2.50$ |
| Erector 34 | KzF-2 | 1.5294 | 51.8 | $R_5=-84.13$ | $t_3=2.00$ |
|  |  |  |  | $R_6=-1474.30$ | $d_3=47.44$ to 9.94 |
| Compensator 52 | SF-8 | 1.6889 | 31.15 | $R_7=+86.52$ | $t_4=2.00$ |
|  |  |  |  | $R_8=+41.23$ | $d_4=1.40$ |
| Compensator 53 | BK-7 | 1.5168 | 64.2 | $R_9=+43.42$ | $t_5=8.88$ |
|  |  |  |  | $R_{10}=-84.95$ | $d_5=3.97$ to 41.47 |
| Relay 40 | SK-16 | 1.6204 | 60.29 | $R_{11}=+71.62$ | $t_6=4.00$ |
|  |  |  |  | $R_{12}=+167.83$ | $d_6=2.00$ |
| Relay 39 | F-2 | 1.620 | 36.34 | $R_{13}=-195.95$ | $t_7=4.00$ |
|  |  |  |  | $R_{14}=-220.00$ |  | wherein Nd is the refractive index for D line, V is Abbe's dispersion number, LaF is lanthanum flint, KzF is short flint, SF is dense flint, BK is borosilicate crown, SK is dense crown, F is flint, R is radius curvature, d is axial air space between lenses, and t is axial lens thickness, and the clear diameter of the erector is 21.00 mm. for constant brightness.

References Cited in the file of this patent

UNITED STATES PATENTS

| 2,165,341 | Capstaff et al. | July 11, 1939 |
| 2,566,485 | Cuvillier | Sept. 4, 1951 |
| 2,732,763 | Back et al. | Jan. 31, 1956 |
| 2,741,155 | Hopkins | Apr. 10, 1956 |